United States Patent

Ottoson

[11] 3,916,276
[45] Oct. 28, 1975

[54] DIRECT CURRENT MOTOR DRIVE

[75] Inventor: Allen E. Ottoson, Westboro, Mass.

[73] Assignee: Vee-Arc Corporation, Westboro, Mass.

[22] Filed: Mar. 28, 1974

[21] Appl. No.: 455,669

[52] U.S. Cl............................... 318/269; 318/331
[51] Int. Cl.².......................................... H02P 5/16
[58] Field of Search .......... 318/269, 302, 310, 311, 318/331, 341, 345, 375

[56] References Cited
UNITED STATES PATENTS

| | | | |
|---|---|---|---|
| 3,497,786 | 2/1970 | Lombardo | 318/331 X |
| 3,792,330 | 2/1974 | Ottoson | 318/269 |
| 3,812,409 | 5/1974 | Dinger | 318/310 |

*Primary Examiner*—Robert K. Schaefer
*Assistant Examiner*—W. E. Duncanson, Jr.
*Attorney, Agent, or Firm*—Kenway & Jenney

[57] ABSTRACT

A DC motor maintains a constant preset speed under changes of load, the preset speed being variable manually. The system includes an AC source, with a conventional bridge rectifier using thyristors and diodes, with means for controlling the phase of firing the thyristors depending on the motor speed in comparison with a speed setting. A dynamic braking system is provided to cause acceptably fast deceleration when a reduction in speed is called for.

4 Claims, 10 Drawing Figures

DIRECT CURRENT MOTOR DRIVE

BACKGROUND OF THE INVENTION

DC motors driven from rectified AC sources through thyristors (silicon controlled rectifiers) have presented difficulties in variable-speed operation because of discontinuities in current supply to the motor. A measure of the effect of discontinuities in the armature current is afforded by the "form factor" which is the ratio of rms to average current. My prior U.S. Pat. No. 3,792,330, dated Feb. 12, 1974, issued on an application Ser. No. 288,900 filed Sept. 14, 1972, describes an improved system, utilizing a substantially constant current source, with thyristors used as current diverters to control the direct current supplied to the motor.

SUMMARY OF THE INVENTION

According to the invention, further improvements are provided, looking toward accurate speed control, precise firing of the thyristors and simple and effective commutation of the thyristors, without damage to the thyristors or other parts of the system.

An improved dynamic braking system is provided to dissipate the kinetic energy of the armature and cause rapid deceleration from a high to a lower set speed, by activation of a thyristor when slow-down is called for and precise commutation thereof when the speed reaches the proper level.

BRIEF DESCRIPTION OF THE DRAWINGS

In the accompanying drawings.

GENERAL DESCRIPTION

Figure 1:
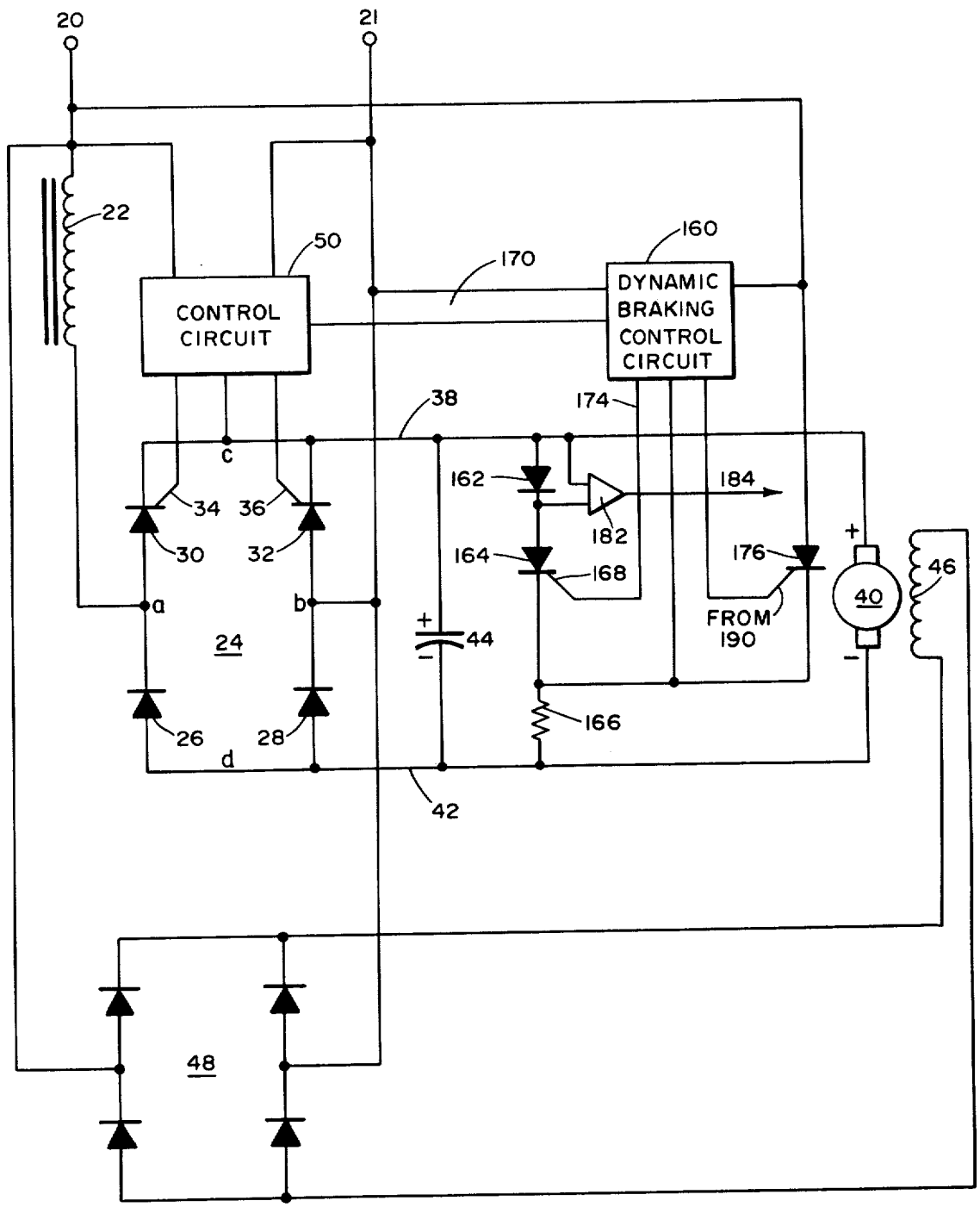
FIG. 1 is a diagram of the preferred embodiment of the invention.

As shown in FIG. 1, the AC supply lines are at 20, 21. One of the lines (20) leads through an inductive reactor or choke 22 to a conventional controlled rectifier circuit 24 comprising two diodes 26, 28 and two thyristors (silicon controlled rectifiers hereinafter termed SCR's) 30 and 32, having control gates 34 and 36 respectively. The diodes and SCR's are arranged as a bridge, with the input power leads connected to the junctions $a$ and $b$, while the junction $c$ between the two SCR's is connected by a lead 38 to the positive terminal of the armature 40 of the DC motor. The junction $d$ between the diodes is connected by a lead 42 to the negative terminal of the armature. An armature filter capacitor 44 is connected across the armature terminals.

The motor field 46 is excited from the mains through a rectifier 48 shown as a conventional full-wave rectifier in the form of a four-diode bridge.

The supply of current to the armature is controlled by gating of the SCR's 30 and 32. Thus, if the SCR's are turned continuously on, the bridge 48 acts as a full-wave rectifier to pass maximum current to the motor armature and armature filter capacitor. When the SCR's are turned off current flows from the armature filter capacitor to the motor armature. By use of the control circuit, shown as a block 50 in FIG. 1, to be later described in detail, the SCR's may be turned on at intermediate times in their half-cycles to vary the current passed to the armature and armature filter capacitor. At some point in a positive half-cycle, the current path is from line 20, through choke 22, junction $a$, SCR 30, lead 38, armature 40 and capacitor 44, lead 42, diode 28 and junction $b$ to main line 21. On a negative half-cycle SCR 30 is off and SCR 32 starts to conduct at a controlled time, so that a DC current path leads from junction $b$ through SCR 32 and diode 26 to junction $a$. During the part of the cycle when SCR's 30 and 32 are not on, current flows from capacitor 44 to armature 40.

CONTROL CIRCUIT FOR SCR'S

The control circuit 50 is a phase-control network to control the times at which the SCR's 30 and 32 are turned on. The network is in general similar to that described in my above-mentioned patent, but because of some differences it will now be described in detail.

Figure 2:
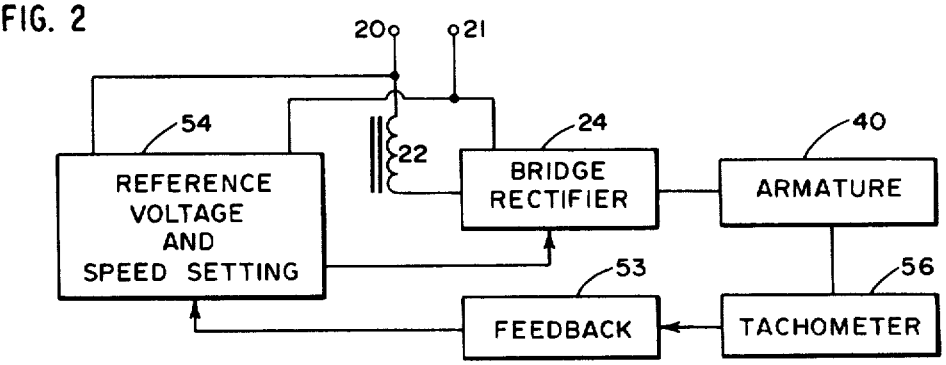
FIG. 2 is a block diagram to illustrate the speed control.

A block diagram of the control system 50 appears in FIG. 2. The phase control according to the invention is carried out by a feedback loop 53 responsive to a speed setting and to the actual speed of the motor, as indicated by the block 54. The speed setting is a manual setting for desired speed, by which a "reference" voltage is generated, and this reference voltage is compared to a voltage proportional to the motor speed, this speed voltage being conveniently generated by a tachometer 56. The reference voltage is supplied by any suitable DC source, shown as a battery 58 in FIG. 3. (Alternatively, rectified AC may be used, with provision for constant DC voltage, as with a Zener diode.)

The reference voltage at the terminals $e$ and $f$ may conveniently be about 10 volts. A connection is made from the positive terminal $e$ to a potentiometer 66 and thence to the negative terminal $f$. The slider 68 of the potentiometer at voltage $V_s$ above the negative terminal $f$ is a manual setting corresponding to a desired speed of the motor.

There is a potential difference between the slider 68 and poiot $f$. The potential difference between the slider and point $f$ is $V_R$ and this potential difference is called the reference voltage. This reference voltage opposes a voltage proportional to the actual speed of the motor, which voltage may be obtained from a tachometer 56 driven by the motor. (In a modified form of the invention to be described later, the speed voltage may be taken from the armature terminals, with compensation for the IR drop in the armature.)

Figure 3:
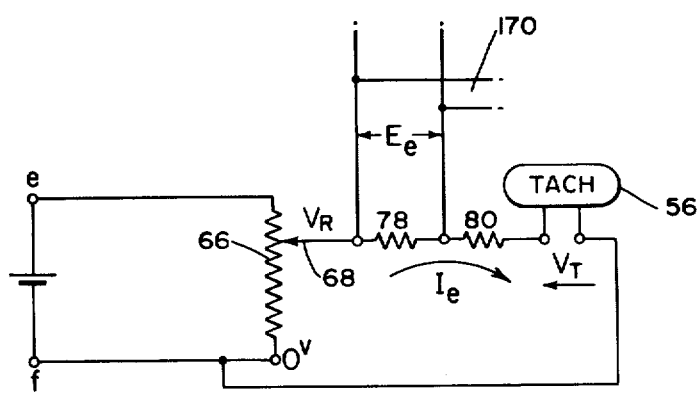
FIG. 3 is a diagram showing the preferred speed control circuitry.

As shown in FIG. 3 a connection is made from the slider 68 through resistors 78 and 80 and the tachometer terminals to the point $f$. This circuit carries a current designated the error current $I_e$, and the voltage across the resistor 78 is an error voltage $E_e$. This error voltage is $$E_e = \frac{R_{TN}}{R_{TN} + R_{KO}}(V_R - V_T)$$

where the resistance values of the resistors 78 and 80 are indicated by R with appropriate subscripts, $V_R$ is the reference voltage as above defined and $V_T$ is the tachometer output voltage.

The error voltage $E_e$ is therefore variable. The system parameters are chosen so that the reference voltage $V_R$ is always greater than the speed voltage $V_T$ under stable operating conditions, and the error current $I_e$ then flows in the direction indicated by the arrow $I_e$. A certain value of $E_e$ corresponds to the condition of the actual speed being equal to the set speed. If $E_e$ is higher or lower than that value, the SCR's 30 and 32 are fired at earlier or later times in their half-cycles, to increase or decrease the current supplied to the motor armature.

The manner in which the error voltage is used to control the gates of the SCR's to time the firing thereof is by a phase control circuit, which in general principle is of the usual resistance-capacitance type. In Flg. 4, a variable resistor is shown diagrammatically at 82 with terminals g and h. The resistor and a capacitor 84 are connected in series across the secondary of a transformer 86. Between g at the junction of the resistor-capacitor and a center tap k of the secondary is a circuit comprising a resistor 88 and the primary of a transformer 90, across which is a capacitor 92. The secondaries of the transformer 90 are used to control the transmission of firing pulses to the gates of the SCR's, as will presently appear.

Figure 4:
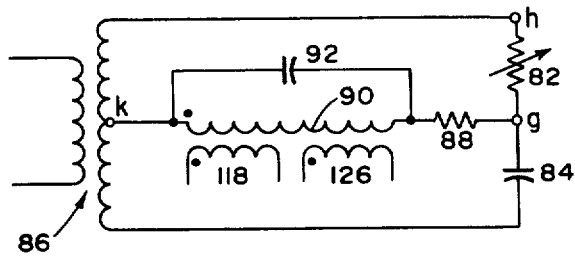
FIG. 4 is a diagram of the phase control for the thyristors.
Figure 5:
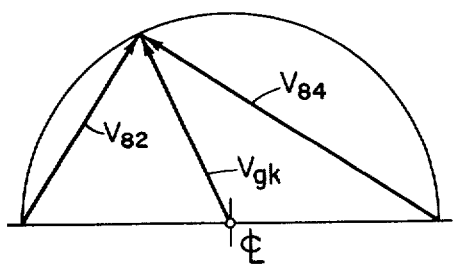
FIG. 5 is a vector diagram for the control circuit of FIG. 4.

The vector diagram for the circuit of FIG. 4 appears in FIG. 5. Since the capacitor and variable resistor carry substantially the same current (the current through the g–k path being limited by the resistor 88), the voltages $V_{82}$ and $V_{84}$ across the resistor and capacitor are in quadrature and the locus of the ends of their vectors is a semicircle, whereby the voltage between g and k is of constant magnitude but of varying phase. As the resistance of the resistor 82 is increased the phase of $V_{gk}$ is retarded.

According to the invention the resistor 82 is varied in accordance with the error voltage. The lower the error voltage, the higher will be the resistance, and the more will the phase of $V_{gk}$ be retarded, so that firing of the SCR's will occur at later instants in their respective half cycles. the later the firing the less will be energy delivered to the armature.

Figure 6:
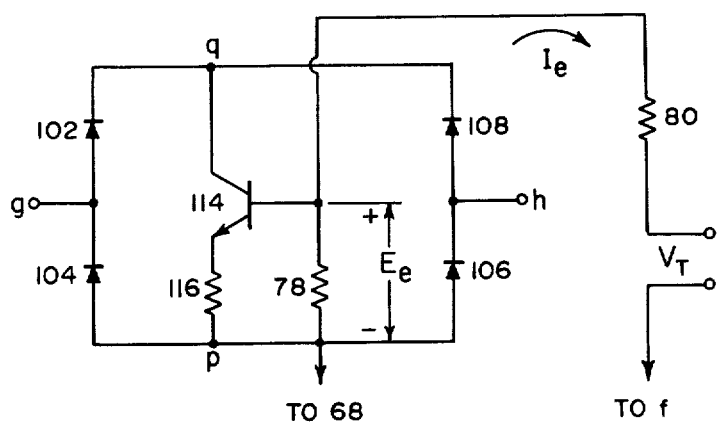
FIG. 6 is a diagram of the preferred means for obtaining variable resistance for phase control.

Although any suitable arrangement for varying the resistor 82 in accordance with the error voltage may be used, the preferred form of the phase-control resistor is obtained by use of a transistor and four diodes connected as shown in FIG. 6. The four diodes designated 102, 104, 106 and 108 are connected as a bridge, the input terminals of which are the terminals g and h of the phase-control resistor. The other junctions of the bridge are p and q. The error voltage across the resistor 78 is applied between the junction p and the base of a transistor 114 of which the emitter in series with a resistor 116 is connected to p, while the collector is connected to q, the transistor-resistor combination being in the "emitter-follower" connection. The junctions g and h of the bridge constitute the similarly designated terminals of the resistor 82 shown in Flg. 4. For comparison with FIG. 3, the resistor 80, the tachometer terminals and the error current $I_e$ are shown in FIG. 6.

By the arrangement of FIG. 6, the base-emitter voltage of the transistor is the error voltage $E_e$. The effective resistance of the circuit between the terminals g and h is therefore governed by the control voltage on the transistor. The higher the error voltage the more transistor current will flow and hence the lower the effective resistance of the path through the transistor will be. The diodes allow a unidirectional current through the transistor with an alternating voltage between the terminals g and h. On one half-cycle current flows from g and h through diode 102, transistor 114, resistor 116 and diode 106, and on the next half-cycle, the flow is from h to g through diodes 108 and 104.

Noting that changes in current through the transistor 114 result in changes of effective resistance between the terminals g and h, it will be seen from FIG. 4 that these changes result in changes of phase of the voltage across the primary of transformer 90. The phase of the voltage across the primary of transformer 90 may be used in any suitable or well-known manner to control the firing angle of the SCR's 30 and 32. However, for purposes of the present invention, a special phase-control circuit is preferably used, as shown in FIG. 7.

Figure 7:
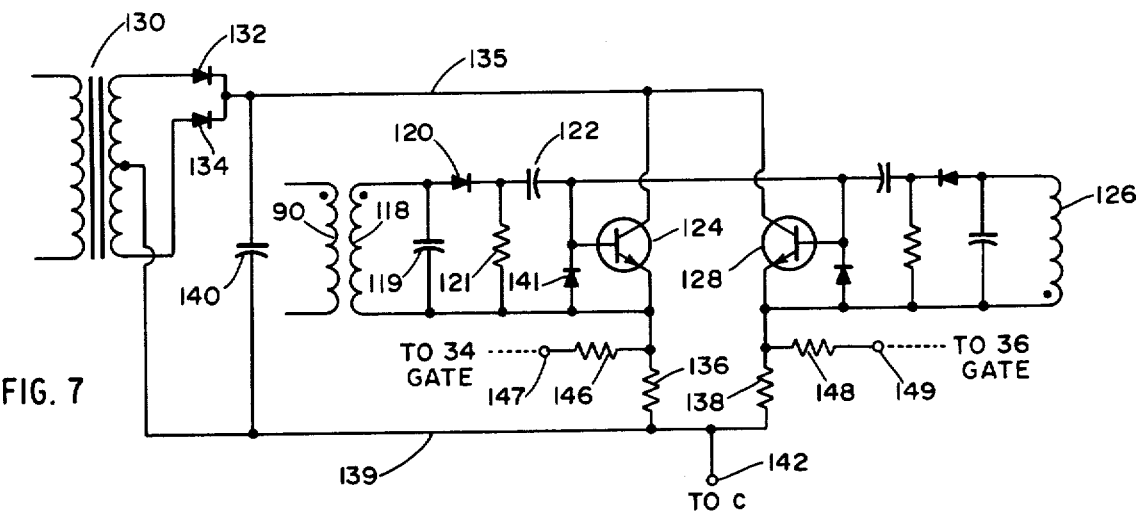
FIG. 7 is a diagram of the circuit for controlling the firing of the thyristors.

The primary 90 of the phase control transformer, previously described in connection with FIG. 4, is shown in FIG. 7. A secondary 118 of transformer 90 with a capacitor 119 across it connects through a diode 120 to a parallel resistor 121 and a series capacitor 122 which applies control voltage to the base of a transistor 124.

A diode 141 is connected between the emitter and base of the transistor 124. At the other side of the figure is shown another secondary 126 of the transformer 90 likewise arranged through a similar circuit to apply a control voltage to the base of a transistor 128. These transistor circuits are powered by a full-wave rectifier circuit including a transformer 130 connected to the line and having a center-tapped secondary leading through diodes 132 and 134 to a lead 135 connected to the collector terminals of the transistors 124 and 128, which transistors are connected through resistors 136 and 138 respectively to the center-tap lead 139. A filter capacitor 140 is connected between the positive lead 135 and the center-tap lead 139. The circuitry associated with the transistor 128 is identical with that for the transistor 124, as shown in FIG. 7, and the detailed description is not repeated.

The center-tap lead 139 has a terminal 142 which is connected to the junction c of the cathodes of the SCR's 30 and 32 of FIG. 1.

In FIG. 7 the junction of the emitter of transistor 124 and the resistor 136 is connected through a resistor 146 to a terminal 147, and the corresponding junction for transistor 128 is connected through a resistor 148 with a terminal 149. The terminals 147 and 149 are connected to the gates 34 and 36 of the SCR's 30 and 32 respectively, whereby the voltages of these terminals with respect to the terminal 142 constitute the gate-to-cathode voltages of the respective SCR's. The means by which gating pulses are transmitted at proper times to the SCR's are described as follows: On a rising part of the sine wave of the voltage of the secondary 118, applied across capacitor 119, the diode 120 conducts and turns the transistor 124 "on." The transistor conducts current in saturation until about the peak of the sine wave, so that the voltage across resistor 136 is a flat-topped pulse about 70° long. As the voltage across the secondary 118 declines from its peak the capacitor 122 discharges through resistor 121 and diode 141, turning off transistor 124 and ending the pulse. The capacitor 122 absorbs the difference between the secondary voltage and the base-emitter voltage of transistor 124. A similar action occurs in the circuit associated with transistor 128.

Figure 8:
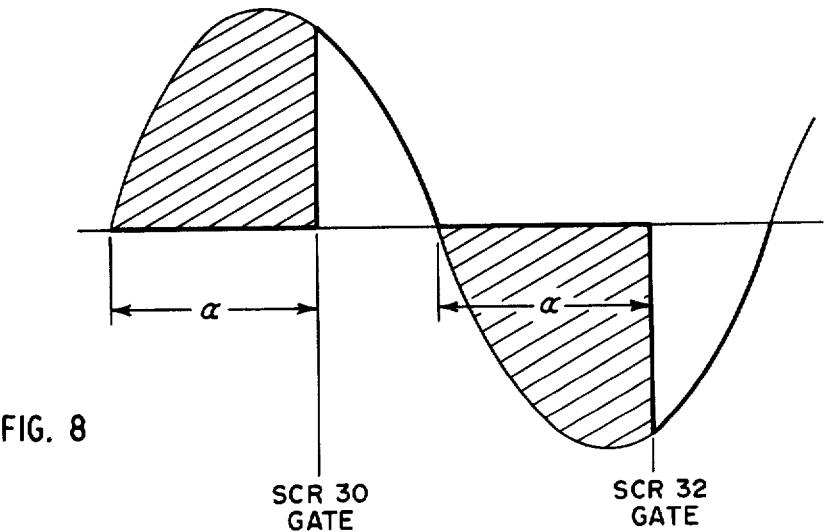
FIG. 8 is a timing diagram.

The timing diagram for the phase control circuit is presented in FIG. 8. In the first part of the first half-cycle shown in the diagram the SCR's are turned off. At some phase angle $\alpha$ a pulse is applied from the control circuit to the gate of SCR 30, thereby causing armature current to flow through SCR 30 and diode 28. Current continues through this circuit until the total current passes through zero, at which time the SCR 30 is turned off. In the ensuing negative half-cycle no current flows to the armature through diode 26 and SCR 32 up to the same phase angle $\alpha$, after which time current flows through diode 26 and SCR 32 for the remainder of the negative half-cycle.

The capacitor 44 across the armature smooths and thereby improves the form factor of the armature current.

As heretofore explained, the error voltage has a value proportional to the difference between the speed voltage $V_T$ and the reference voltage $V_R$. If the motor has been running under a constant load and at a constant speed, and if the load is then increased, the motor will momentarily slow down, decreasing the speed voltage $V_T$ and therefore increasing the error constant and error voltage. The transistor circuit between g–h of FIG. 6 then acts like a lower resistance; or stated in another way, the resistance of the variable resistor 82 is decreased, and hence the phase angle $\alpha$ of $V_{gk}$ is decreased. This causes the SCR's 30 and 32 to fire earlier in their respective half-cycles, so that the motor then receives more current and the motor speed is restored.

Similar conditions exist if the speed setting is increased. The increase in reference voltage $V_R$ causes a momentary increase in error voltage, and the SCR's fire earlier in their half-cycles, so that the motor current increases to bring the actual motor speed up to the set speed.

As a result of the conditions in the control circuit, the error voltage $E_e$ assumes the following values: It is positive when the motor is under load, and it increases as the load increases; that is, under steady load conditions, $E_e$ is small under no load or light load and large heavy load. When the motor speed is higher than the reference speed, the motor acts as a generator, $E_e$ being then negative.

DYNAMIC BRAKING

As stated in my above-mentioned patent, if the motor is operating at a high speed and it is desired to change to a lower speed which is done by setting the voltage $V_R$ to a lower value, the speed will drop only at a rate determined by the dissipation of kinetic energy of the armature and load. This is the "generating" or overspeed condition mentioned above. In order to cause an acceptably fast deceleration, dynamic braking is provided. The dynamic braking system of the present invention produces results similar to those of my patent but an improved control system is herein provided. Under the overspeed condition the error voltage is negative.

Figure 9:
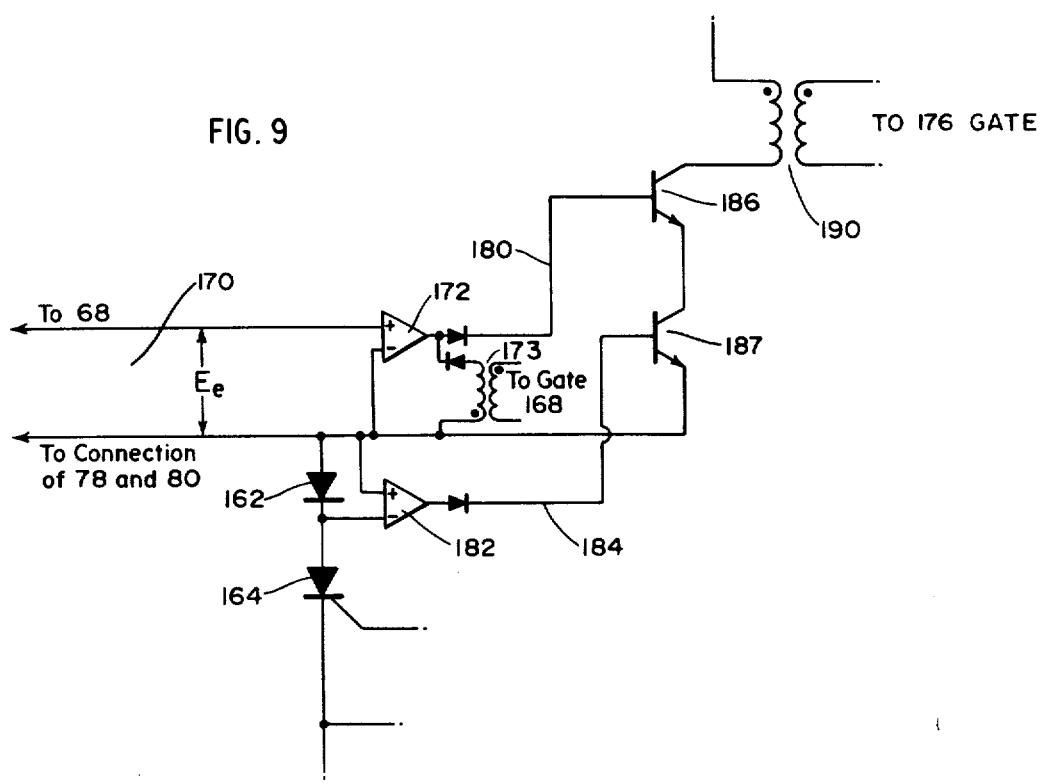
FIG. 9 is a diagram illustrating the control of a dynamic braking system.

The dynamic braking control circuit is shown as a block 160 in FIG. 1. Across the armature, in series starting with the positive terminal are a diode 162, a dynamic braking SCR 164, and a dynamic braking resistor 166. The SCR 164 is gated on only when the error voltage $E_e$ is negative, and to this end the voltage $E_e$ is fed through lines 170 into an amplifier 172 (FIG. 9), the output of which is arranged to apply a gating pulse to a pulse transformer 173 for gate 168 of the dynamic braking SCR 164 whenever $E_e$ becomes negative. Since the motor is in the generating mode at that time, conduction is established from the armature through the diode 162, SCR 164 and the resistor 166, thereby rapidly dissipating the kinetic energy stored in the armature and load.

As the motor slows down it soon reaches a speed at which the error signal becomes positive again, thereby gating SCR 164 to "off" condition, but the SCR continues to conduct because positive voltage is still applied to it from the armature. A commutating SCR 176 is gated "on" by the control circuit 160 at the same time that SCR 164 is gated "off." This commutating SCR is connected to the AC line 20 and also to the dynamic braking SCR 164 in a direction to apply positive line voltage to resistor 166, thus applying reverse voltage to SCR 164, thereby commutating it.

The firing of the commutating SCR 176 occurs when two conditions are satisfied simultaneously, to wit: (1) the error voltage $E_e$ is positive, and (2) current is flowing through the dynamic braking SCR 164. The circuit for accomplishing this result is shown diagrammatically in FIG. 9. The amplifier 172 has $E_e$ as an input and delivers an output through diode to a line 180 when $E_e$ is positive.

As heretofore noted the diode 162 is in series with the dynamic braking SCR 164 and the resistor 166. When SCR 162 is conducting there is a voltage drop across the diode, which drop is of the order of 0.6 volt. The circuit shown in FIG. 9 includes two amplifiers, namely, the amplifier 172 having a positive output only when the error voltage is positive, and an amplifier 182 having its input connected across the terminals of the diode 162, so that it has a positive output 184 when the positive voltage drop of 0.6 volt exists across the diode. (This positive voltage drop cannot exist when the motor is operating in the motor mode, since no current then flows through the dynamic braking SCR.) An output at 184 is therefore an indication that condition (2) mentioned above exists, namely, that dynamic braking current is flowing. Condition (1), positive error voltage, is indicated by an output at 180. Two series transistors 186 and 187 are rendered conducting when outputs appear simultaneously on lines 180 and 184. Therefore, when $E_e$ changes from negative to positive, the two conditions above mentioned are satisfied, and a pulse is delivered through the two series transistors to a pulse transformer 190, the secondary of which is connected to the gate of the commutating SCR 176.

When SCR 176 is thus gated "on" the reverse voltage applied to SCR 164 commutates the latter "off," thus terminating the dynamic braking action. The "AND" control circuit is then no longer operative to maintain the voltage on the gate of the commutating SCR, and on the next negative half-cycle of the AC supply SCR self-commutates to the "off" condition. These actions of first commutating the dynamic braking SCR and then self-commutating the commuting SCR 170 are brought about through the connection of SCR 176 to the AC line, whereby no commutation capacitor or inductor is necessary. Therefore a simple and reliable system is provided.

MODIFIED ERROR MEASUREMENT

Instead of using a tachometer for generating a voltage proportional to the speed as in FIG. 3, it is possible to utilize the counter EMF of the armature. The voltage at the armature terminals may be introduced into the error circuit in place of $V_T$. However, the terminal voltage will be higher than the counter EMF by the $I_a R_a$ drop where $I_a$ is the armature current and $R_a$ is the armature resistance.

Figure 10:
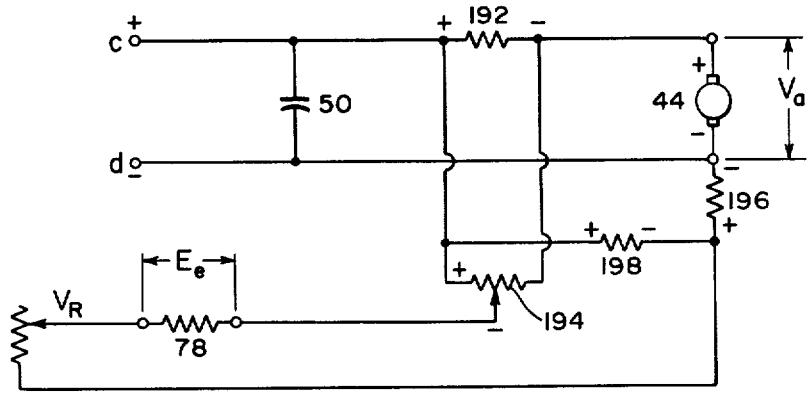
FIG. 10 is a diagram of a modified system.

To compensate for the $I_a R_a$ drop the circuit in FIG. 10 may be used in place of that of FIG. 3. A small value compensating resistor 192 is in series with the armature. A potentiometer 194 is connected across the resistor 192 and the slider thereof is connected with the resistor 78. The voltage between the slider and the positive end of the compensating resistor is substantially proportional to the IR drop in the resistor 192. Connected from the negative of the armature is a resistor 196 in series with a resistor 198, the latter being connected to the positive end of the potentiometer whereby the potential difference across 198 is $$\frac{R_{198}}{R_{196} + R_{198}}$$

times the terminal voltage $V_{cd}$. The voltage across 192 is small so that $V_{cd}$ approximates the armature terminal voltage $V_a$. By proper selection of the ratio of the resistance and the setting of the potentiometer 194 slider, it is possible to compensate for the voltage drop in the armature resistance, by subtracting the voltage across the positive end and slider of potentiometer 194 from the voltage across $R_{198}$, so that the error voltage $E_e$ across resistor 78 correctly represents the difference between a reference voltage $V_R$ and a speed voltage $V_T$ but with the speed voltage derived from the counter EMF of the motor.

MOTOR CHARACTERISTICS

The speed torque characteristics of the motor with firing phase angle $\alpha$ equal to zero are standard for a separately excited motor, that is, with droop in the speed as the torque is increased. Constant speed operation is by varying the phase angle $\alpha$ in accordance with the error voltage. For any given speed setting at the voltage divider 66 the error voltage $E_e$ will be such that at any load the armature voltage will be maintained at a value on one of the speed-torque characteristic curves so that the speed will remain constant.

SUMMARY OF OPERATION

Considering the first positive half-cycle, the SCR 30 is turned on at a time represented by the phase angle $\alpha$, so that current flows to the armature for the remainder of the half-cycle. At the end of the positive half-cycle, the SCR 30 turns off by reason of the reversal of current. In the ensuing negative half-cycle the bridge supplies rectified current to the armature circuit during the interval after the time represented by the angle $\alpha$, for the remainder of the half-cycle. Therefore the bridge supplies current to the armature circuit and filter capacitor during the angle $\pi - \alpha$ and the filter capacitor supplies current during the angle $\alpha$ of each half-cycle, as indicated by the solid line graph of FIG. 8.

The phase angle at which the SCR's 30 and 32 fire is determined by a comparison of the actual speed with the speed setting. Under light loads the angle $\alpha$ will be large, and the armature will receive energy from the bridge during only a small portion of each half-cycle. Under heavy loads, the angle $\alpha$ will be large, and energy will be delivered from the bridge to the armature during most or all of each half-cycle.

In any case the firing angle is determined by the error voltage, which is the difference between the set voltage and a voltage proportional to actual speed. The set voltage itself is determined manually for any desired speed.

The speed-torque characteristics are those of a typical self-excited motor. So long as all conditions are constant the motor operates at constant speed and torque. If the load then increases the speed will tend to fall, and this results in a lower speed voltage and hence a higher "error" voltage, which causes the SCR's to fire at earlier times in their half-cycles, so that increased energy is supplied to the motor to maintain its speed under the increase of load. Constant speed operation therefore involves a shift from one speed-torque characteristic to another as the load is varied.

Under conditions in which the load is constant, the error voltage will be constant, and will in all cases be just sufficient to maintain the speed at the set value. When an increase in speed is called for by a new setting of the manual control, the error voltage will increase, and this will call for firing of the SCR's at earlier points in their cycles, so that more energy will be supplied to the motor to bring its speed up to the set value.

Therefore whenever there is an increase of load at a given set speed or an increase of the set speed for a given load, the system automatically adjusts itself to increase the energy supplied to the motor. A new equilibrium is established at which the energy supplied to the armature is just sufficient to maintain the desired speed under the existing load conditions. The time required for the establishment of the new conditions will be determined by the time constants of the various components of the system.

A different situation exists, however, when a reduction of supplied energy is called for, as a result of a lowering of the manual set speed. The rotational energy of the armature and load must then be dissipated, and this dissipation of energy might require an inordinately long time if it depended entirely on friction and windage losses. In order to bring the motor quickly to its new characteristic, the dynamic braking feature of the invention is utilized. This operates whenever the error voltage is negative. Then the motor is acting as a generator to feed energy into the dissipation circuit, wherein the excess energy is quickly dissipated electrically in order to bring the motor into the new equilibrium condition in which the energy supplied is just sufficient to maintain the load at the lower speed.

A feature of the invention is that under all conditions of operation, continuity of armature current is maintained. Therefore, notwithstanding the sharp establishment of current at the SCR's 30 and 32, the problems of poor commutation, cogging and poor regulation frequently encountered in driving DC motors from rectified current are avoided. Stated in another way, the form factor of the armature current is maintained near unity, usually not over about 1.05. The form factor is the ratio of rms to average value. A form factor near unity indicates that no discontinuity in the armature current exists.

Another feature of the invention lies in the protection afforded by constant current operation. Thus overloading or stalling of the motor, or short-circuiting of any part of the d.c. circuit, cannot result in damage to any part of the system. For the same reason, the SCR's are protected from "shoot-through" at all times, regardless of transient or overload conditions in the system. The system is also protected against damage from external conditions, such as line voltage transients, and the semiconductors are protected from "shoot-through" under all conditions.

I claim:

1. A variable speed motor system comprising an AC source, a DC motor having an armature, a bridge rectifier including thyristors, an inductor between the source and the rectifier, connections from the rectifier to the armature, a capacitor across the armature, said thyristors comprising silicon controlled rectifiers having conduction control gates, means for applying firing potentials to said gates at selected times in successive half-cycles to control the current supplied to the armature, a reference circuit, means for introducing into the reference circuit a manually selected reference voltage, means for introducing into the reference circuit a speed voltage dependent on the motor speed, means for obtaining in the reference circuit an error voltage which is the difference between the reference voltage and the speed voltage, a phase control circuit including a capacitor and a variable resistance for determining the times at which the firing potentials are applied to the gates in successive half-cycles, and means for controlling the variable resistance in accordance with the error voltage.

2. A variable speed motor system comprising an AC source, a DC motor having an armature, a bridge rectifier including thyristors, an inductor between the source and the rectifier, connections from the rectifier to the armature, a capacitor across the armature, said thyristors comprising silicon controlled rectifiers having conduction control gates, and means for applying firing potentials to said gates at selected times in successive half-cycles to control the current supplied to the armature, a reference circuit, means for introducing into the reference circuit a manually selected reference voltage, means for introducing into the reference circuit a speed voltage dependent on the motor speed, means for obtaining in the reference circuit an error voltage which is the difference between the reference voltage and the speed voltage, and means controlled by the error voltage for determining times of applying the firing potentials to the gates, a dynamic braking circuit connected across the armature and including a dynamic braking thyristor and a dynamic braking resistor, means for firing the dynamic braking thyristor when the error voltage is of a value to call for a reduction in motor speed, whereby energy is dissipated in the dynamic braking resistor, a commutating thyristor connected between the AC line and the dynamic braking thyristor to apply a reverse voltage to the dynamic braking thyristor, to commutate the latter off, means controlled by the error voltage arriving at a value corresponding to the desired reduced speed for firing the commutating thyristor, said firing occurring during a positive half-cycle of the source, the commutating thyristor being itself commutated off on a succeeding negative half-cycle.

3. A variable speed motor system comprising an AC source, a DC motor having an armature, a bridge rectifier including thyristors, an inductor between the source and the rectifier, connections from the rectifier to the armature, a capacitor across the armature, said thyristors comprising silicon controlled rectifiers having conduction control gates, and means for applying firing potentials to said gates at selected times in successive half-cycles to control the current supplied to the armature, a reference circuit, means for introducing into the reference circuit a manually selected reference voltage, means for introducing into the reference circuit a speed voltage dependent on the motor speed, means for obtaining in the reference circuit an error voltage which is the difference between the reference voltage and the speed voltage, and means controlled by the error voltage for determining times of applying the firing potentials to the gates, means controlled only when the error voltage is one polarity to control the times of applying the firing potentials to the gates, the error voltage of the opposite polarity occurring when motor is slowing down and is in a generating condition, a dynamic braking circuit across the armature and including a dynamic braking thyristor and a dynamic braking resistor, firing means for applying a gating potential to the dynamic braking thyristor when the error voltage is of said opposite potential whereby energy is dissipated in the dynamic braking resistor, a commutating thyristor connected between the AC line and the dynamic braking thyristor to apply a reverse voltage to the dynamic braking resistor to commutate the latter off, means controlled by conjoint action of the error voltage resuming its first-named polarity and current flowing in the dynamic braking circuit to fire the commutating thyristor, and thereby to commutate the dynamic braking thyristor, said commutating thyristor being itself commutated on a negative half-cycle of the AC line.

4. A system as defined in claim 3, in which the dynamic braking circuit includes a diode in which there is a forward voltage drop when the dynamic braking thyristor is conducting, and means for utilizing said voltage drop to detect the flow of current in the dynamic braking circuit and thus to control the firing of the commutating thyristor when the error voltage changes from its opposite polarity to its first-named polarity.

* * * * *